US012580139B2

(12) United States Patent
Bodenmeier et al.

(10) Patent No.: US 12,580,139 B2
(45) Date of Patent: Mar. 17, 2026

(54) CONNECTOR FOR A CIRCUIT BREAKER AND A DOWNSTREAM CONTACTOR, FEEDER WITH SUCH A CONNECTOR AND ARRANGEMENT WITH SUCH A FEEDER

(71) Applicant: Siemens Aktiengesellschaft, Munich (DE)

(72) Inventors: Martin Bodenmeier, Parkstein (DE); Tobias Kemptner, Fensterbach (DE); Martin Steinbauer, Schmidmühlen (DE)

(73) Assignee: Siemens Aktiengesellschaft, Munich (DE)

( * ) Notice: Subject to any disclaimer, the term of this patent is extended or adjusted under 35 U.S.C. 154(b) by 237 days.

(21) Appl. No.: 18/448,300

(22) Filed: Aug. 11, 2023

(65) Prior Publication Data

US 2024/0055196 A1 Feb. 15, 2024

(30) Foreign Application Priority Data

Aug. 11, 2022 (DE) ..................... 10 2022 208 368.7

(51) Int. Cl.

*H01H 1/58* (2006.01)
*H01H 71/04* (2006.01)
*H01H 71/08* (2006.01)
*H01H 83/14* (2006.01)

(52) U.S. Cl.

CPC .......... *H01H 1/5866* (2013.01); *H01H 71/04* (2013.01); *H01H 71/08* (2013.01); *H01H 83/14* (2013.01); *H01H 2071/042* (2013.01)

(58) Field of Classification Search

CPC ...... H01H 1/5866; H01H 71/04; H01H 71/08; H01H 83/14; H01H 2071/042; H01H 9/26; H01H 2071/0278; H01H 71/082; H01H 47/00; H01H 50/14; G01R 1/20; H01R 9/2633; H01R 9/2641; H01R 9/2675

USPC ........................................................... 361/42

See application file for complete search history.

(56) References Cited

U.S. PATENT DOCUMENTS 6,411,500 B1 * 6/2002 Kaaden ................ H02B 1/0565 361/624
7,821,364 B2 10/2010 Birzer et al.
7,942,692 B2 * 5/2011 Bodenmeier .......... H01H 89/06 439/511

(Continued)

FOREIGN PATENT DOCUMENTS

CN 202143013 U 2/2012
CN 103107486 B 8/2015

(Continued)

*Primary Examiner* — Sreeya Sreevatsa

(74) *Attorney, Agent, or Firm* — Laurence A. Greenberg; Werner H. Stemer; Ralph E. Locher

(57) ABSTRACT

A connector for a circuit breaker and a downstream contactor has a one-piece configuration and facilitates an electrical connection between the circuit breaker and the downstream contactor. The connector includes at least one sensor, the connector includes an evaluation unit for measured values of the sensor, and the connector includes first contacts for the circuit breaker and second contacts for the downstream contactor, both acting in the same mating direction. A feeder for connecting a load and an arrangement having a distribution system, a load and a feeder, are also provided.

13 Claims, 3 Drawing Sheets

(56) References Cited

U.S. PATENT DOCUMENTS

| | | | | |
|---|---|---|---|---|
| 8,378,767 | B2 * | 2/2013 | Okubo | H01H 50/54 335/78 |
| 2004/0246661 | A1 * | 12/2004 | Busch | H01H 89/06 361/605 |
| 2008/0150660 | A1 * | 6/2008 | Birzer | H01H 50/14 335/106 |
| 2009/0325423 | A1 * | 12/2009 | Bollinger | H01H 89/06 439/638 |
| 2012/0133460 | A1 * | 5/2012 | Okubo | H01H 51/005 335/132 |

FOREIGN PATENT DOCUMENTS

| | | | |
|---|---|---|---|
| DE | 102005040348 | B4 | 1/2008 |
| EP | 0908914 | A2 | 4/1999 |
| EP | 2140471 | B1 | 11/2010 |
| WO | 2008034396 | A1 | 3/2008 |

* cited by examiner

CONNECTOR FOR A CIRCUIT BREAKER AND A DOWNSTREAM CONTACTOR, FEEDER WITH SUCH A CONNECTOR AND ARRANGEMENT WITH SUCH A FEEDER

CROSS-REFERENCE TO RELATED APPLICATION

This application claims the priority, under 35 U.S.C. § 119, of German Patent Application DE 10 2022 208 368.7, filed Aug. 11, 2022; the prior application is herewith incorporated by reference in its entirety.

FIELD AND BACKGROUND OF THE INVENTION

The invention relates to a connector for a circuit breaker and a downstream contactor, a feeder with such a connector and an arrangement including a distribution system, a load and such a feeder.

Until now, so-called feeders including a circuit breaker and a downstream contactor have been used to switch loads, such as motors. The downstream contactor actuates the load, such as the motor. The circuit breaker performs the protective functions such as short-circuit protection, overload protection and phase-failure protection. The downstream contactor allows the loads to be switched regularly while power is applied.

At present, typical feeders are not yet integrated extensively across the digital world of the future. Several constraints need to be taken into account during digital integration, such as the footprint of feeders, the accessibility of the connection points, temperature conditions of the electronics, various configuration levels of the communication, handling during setup, upgradability for existing systems and the usability of previous accessories. Typical feeders with electronics have different configurations and therefore different housings. That very often results in products not being profitable due to the high investment in the configuration of the feeders.

SUMMARY OF THE INVENTION

It is accordingly an object of the invention to provide a connector for a circuit breaker and a downstream contactor, a feeder with such a connector and an arrangement with such a feeder, which overcome the hereinafore-mentioned disadvantages of the heretofore-known devices of this general type and which can be integrated into existing components in a particularly simple manner and adapted to changing requirements in a future-proof manner by a structural arrangement or platform.

With the foregoing and other objects in view there is provided, in accordance with the invention, a connector for a circuit breaker and a downstream contactor, wherein the connector is of one-piece construction, the connector facilitates the electrical connection between the circuit breaker and the downstream contactor and includes at least one sensor, the connector includes an evaluation unit for the measured values of the sensor, and the connector includes first contacts for the circuit breaker and second contacts for the downstream contactor in the same mating direction. Advantageous configurations of the connector according to the invention are specified in dependent claims.

The advantage in this case is that the electronics are housed in the connector, where they can be placed at a point at which the temperatures are lowest, resulting in significant advantages for the electronic components. It is also advantageous that the sequence in which the connector according to the invention is connected is known to the customer. Furthermore, all previous accessory components of the system kit can continue to be used, such as wiring reversal modules, side accessories, supply systems and mounting plates. The connector has the same footprint, and a mixed configuration is therefore possible. All previous feeders using spring-loaded connection technology can be easily retrofitted with the connector according to the invention. There are many variation options for the customer with only a small change in production complexity, expensive tool variants do not arise and variance can be produced by way of assembly options for the printed circuit board or various firmware/software. Likewise, no matching to the basic devices is necessary. The mass-produced and therefore inexpensive basic devices can be used without any adaptation. Very many possible applications can be created using inexpensive basic devices. Variance exists not in the basic devices but in the configuration of the printed circuit board of the connector according to the invention.

In one configuration of the connector according to the invention, the sensor is in the form of a sensor for current measurement, for example in the form of a current transformer, and/or in the form of a sensor for voltage measurement.

In a further configuration of the connector according to the invention, the sensor is disposed electrically between the first contacts and the second contacts in or on the main circuit.

In a further configuration, the connector includes an actuator for actuating the downstream contactor. Likewise, the connector can include a communication interface. Furthermore, the connector can include a read plunger for the contactor position indicator. In addition, the connector can include an actuator for actuating a reversing contactor.

With the objects of the invention in view, there is also provided a feeder, which comprises a circuit breaker, a downstream contactor and a connector according to the invention, wherein the connector forms the mechanical and/or electrical connection between the circuit breaker and the downstream contactor.

In one inventive configuration of the feeder, the connector, the circuit breaker and the downstream contactor are connected to one another in a tool-based manner.

In a further configuration of the feeder according to the invention, the feeder can supply power to an electric motor as a load.

With the objects of the invention in view, there is concomitantly provided an arrangement, comprising a distribution system, a load and a feeder according to the invention for switching a load, wherein the feeder is disposed between the distribution system and the load.

Other features which are considered as characteristic for the invention are set forth in the appended claims.

Although the invention is illustrated and described herein as embodied in a connector for a circuit breaker and a downstream contactor, a feeder with such a connector and an arrangement with such a feeder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
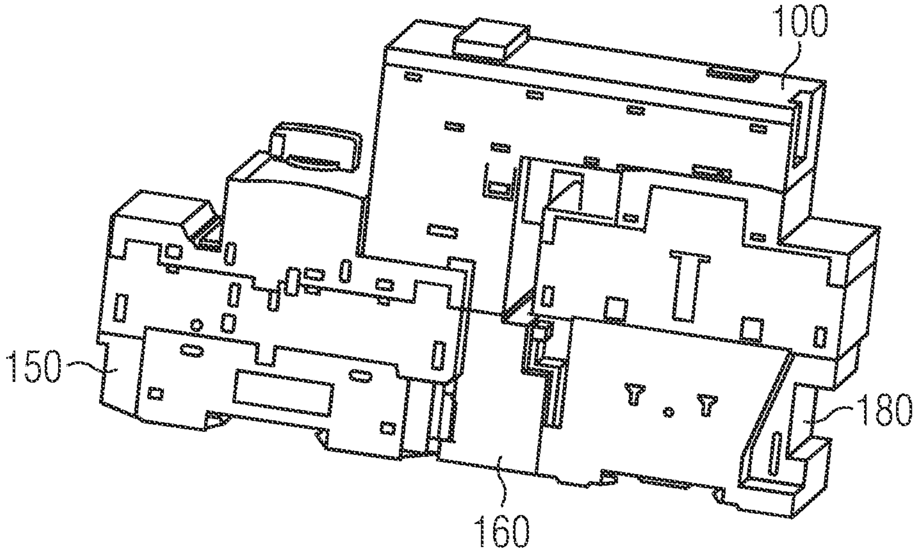
FIGS. 1A and 1B are respective diagrammatic perspective and elevational views of a connector according to the invention with a circuit breaker and a downstream contactor.

Referring now to the figures of the drawings in detail and first, particularly, to FIGS. 1A-4 thereof, there is seen an electrical connector 100 for a circuit breaker 150 and a downstream contactor 180. The connector 100 has an L-shape with two orthogonal legs and is of one-piece configuration, wherein the connector 100 facilitates the electrical connection between the circuit breaker 150 and the downstream contactor 180 and includes at least one sensor 200. In addition, the connector 100 includes an evaluation unit 210 for the measured values of the sensor 200, and first contacts 101 protruding from one of the two legs for the circuit breaker 150 and second contacts 102 protruding from another of the two legs for the downstream contactor 180 in the same mating direction.

In addition to the connector 100 and the circuit breaker 150 and the downstream contactor 180, there can be provision for a mechanical connector 160 that spaces the circuit breaker 150 from the downstream contactor 180 and can additionally serve as a contact surface for the connector 100.

Figure 1B:
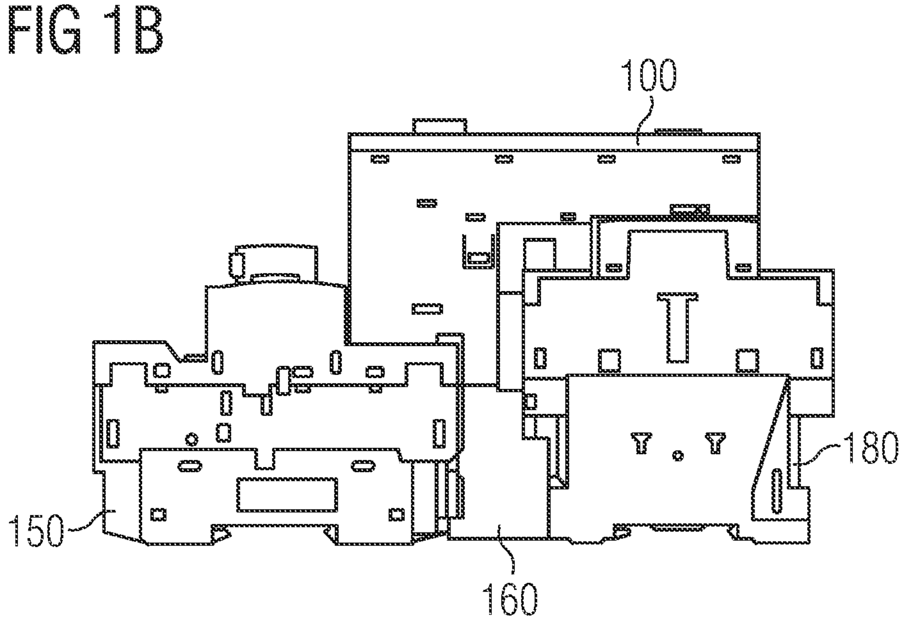

In the illustrations in FIGS. 1A and 1B, the connector 100 according to the invention is mounted on the circuit breaker 150 and the downstream contactor 180.

Figure 2:
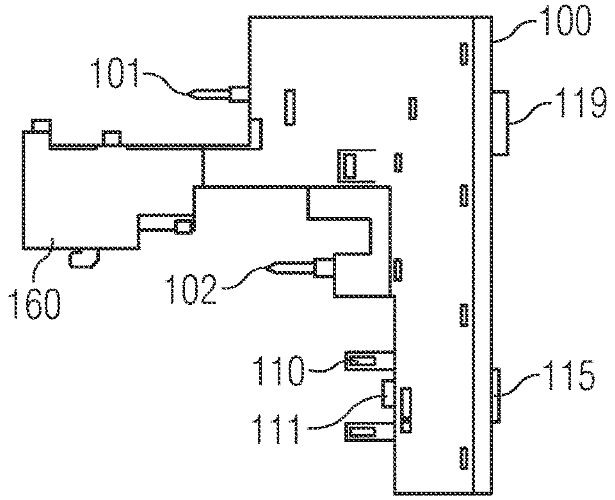
FIG. 2 is an elevational view of a connector according to the invention.

FIG. 2 shows the connector 100 according to the invention and the mechanical connector 160. The connector 100 includes the first contacts 101, which electrically connect the connector 100 to the circuit breaker 150, and the second contacts 102, which electrically connect the connector 100 to the downstream contactor 180. The first contacts 101 and the second contacts 102 are in the same mating direction, which means that the connector 100 according to the invention can be connected to the circuit breaker 150 and the downstream contactor 180 simultaneously by using a single mounting movement.

The sensor 200 of the connector 100 according to the invention can be in the form of a sensor for current measurement, for example in the form of a current transformer, and/or in the form of a sensor for voltage measurement. The sensor 200 can be disposed electrically between the first contacts 101 and the second contacts 102 in or on the main circuit.

The connector 100 according to the invention can moreover include an actuator 110 for actuating the downstream contactor 180, and also a communication interface 119. By way of example, the communication interface 119 can be in the form of a plug or socket for a wired connection; the communication interface 119 can also set up a wireless radio connection by using typical protocols such as Zigbee, WiFi or others.

Further elements on the connector 100 according to the invention can be a read plunger 111 for a contactor position indicator and an actuator 115 for actuating a reversing contactor.

Figure 3:
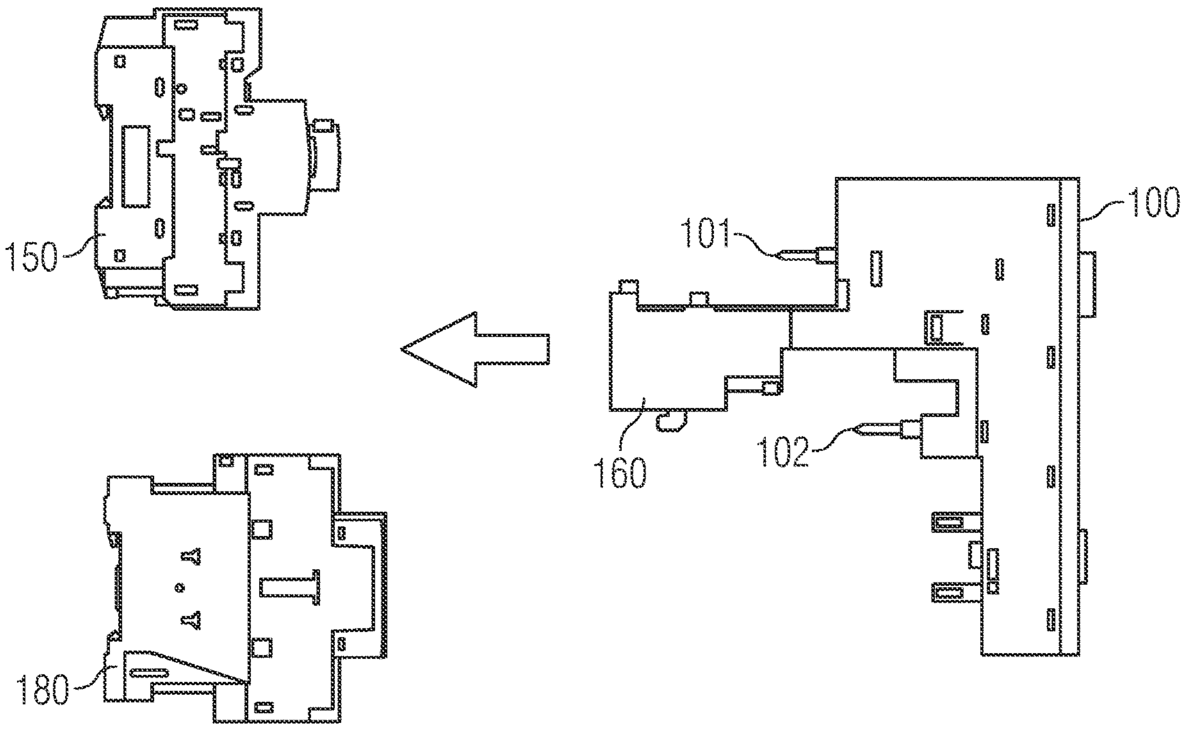
FIG. 3 includes elevational views of a circuit breaker and a downstream contactor and also a connector according to the invention prior to mounting.

FIG. 3 shows the mounting of the connector 100 according to the invention on the circuit breaker 150 and the downstream contactor 180. As a result of the first contacts 101 and the second contacts 102 of the connector 100 being formed in the same mating direction, the connector 100 according to the invention can be mounted on the circuit breaker 150 and the downstream contactor 180 by using a single mating movement. In line with the illustration in FIG. 3, this means that the connector 100 according to the invention can be pushed onto or plugged into the circuit breaker 150 and the downstream contactor 180 in one movement to the left.

Figure 4:
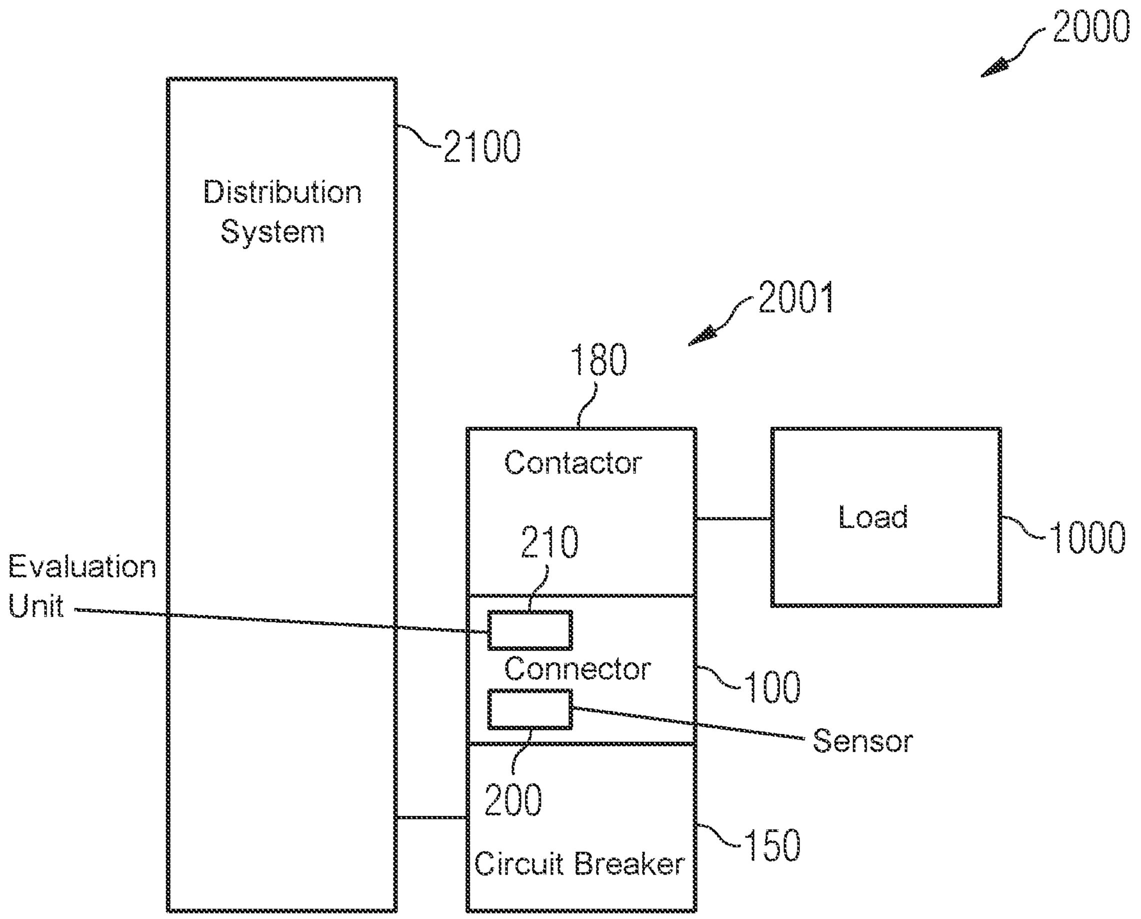
FIG. 4 is a block diagram of an arrangement including a distribution system, a load and a feeder according to the invention.

FIG. 4 shows an arrangement 2000 including a distribution system 2100, a load 1000 and a feeder 2001 for switching a load 1000. The feeder 2001 in turn includes a circuit breaker 150, a downstream contactor 180 and a connector 100 according to the invention, wherein the connector 100 forms the mechanical and/or electrical connection between the circuit breaker 150 and the downstream contactor 180.

The load 1000, for example a motor, is electrically disposed on the downstream contactor 180.

The connector 100 according to the invention includes a sensor 200 and an evaluation unit 210.

The feeder 2001 can be configured in such a way that the connector 100, the circuit breaker 150 and the downstream contactor 180 are connected to one another in a tool-based manner.

In the arrangement 2000, the feeder 2001 is disposed electrically between the distribution system 2100 and the load 1000 by virtue of the distribution system 2100 being electrically connected to the circuit breaker 150 and the load 1000 being electrically connected to the downstream contactor 180.

The electronics of the connector 100 according to the invention, in particular the evaluation unit 210, can be disposed within the connector 100 in such a way that a relatively low and controllable temperature profile acts on them. This is the only meaningful way of using electronics in the connector 100 or in the feeder 2001.

The mating direction of the main current terminals, such as the first contacts 101 and the second contacts 102, is the same, specifically 90° to the device arrangement. All other electrical connections are also disposed in this same mating direction, such as the actuator 110 for actuating the downstream contactor 180. This is the only way to create a system that can be easily integrated into existing systems. Additionally, the contactor switching direction is the same as the mating direction, which allows simple but important reading of the contactor position by way of the read plunger 111.

The mating direction from the front to the circuit breaker 150 and the downstream contactor 180 allows compensation for tolerances in the feeder 2001. This compensation for tolerances can be easily and reliably ensured by bending up the first contacts 101 and the second contacts 102 for the main current path. Another advantage of this arrangement is that the footprint of the feeder 2001 according to the invention remains the same and almost all existing accessories, such as all attachment modules, feed systems, etc., can continue to be used. It is also possible to upgrade all spring-loaded feeders sold to date.

The invention claimed is:

1. A connector for a circuit breaker and a downstream contactor, which comprises:
the connector having a one-piece configuration;
the connector facilitating an electrical connection between the circuit breaker and the downstream contactor;
the connector including at least one sensor;
the connector including an evaluation unit for measured values of the at least one sensor;
the connector being L-shaped and having two legs disposed orthogonal to each other; and
the connector including first contacts protruding from one of the two legs for connecting the circuit breaker and second contacts protruding from another of the two legs for connecting the downstream contactor, the first and second contacts configured to be connected in a same mating direction.

2. The connector for the circuit breaker and the downstream contactor according to claim 1, wherein the at least one sensor is a sensor for current measurement.

3. The connector for the circuit breaker and the downstream contactor according to claim 2, wherein the at least one sensor is at least one of a current transformer or a sensor for voltage measurement.

4. The connector for the circuit breaker and the downstream contactor according to claim 1, wherein the at least one sensor is disposed electrically between the first contacts and the second contacts.

5. The connector for the circuit breaker and the downstream contactor according to claim 1, wherein the connector includes an actuator for actuating the downstream contactor.

6. The connector for the circuit breaker and the downstream contactor according to claim 1, wherein the connector includes a communication interface.

7. The connector for the circuit breaker and the downstream contactor according to claim 1, wherein the connector includes a read plunger for a contactor position indicator.

8. A feeder for connecting a load, the feeder comprising:
the circuit breaker;
the downstream contactor; and
the connector according to claim 1;
the connector forming at least one of a mechanical or electrical connection between the circuit breaker and the downstream contactor.

9. The feeder for connecting the load according to claim 8, wherein the connector, the circuit breaker and the downstream contactor are connected to one another in the same mating direction.

10. The feeder for connecting the load according to claim 8, wherein the feeder is configured to supply power to an electric motor acting as the load.

11. An arrangement, comprising:
a distribution system;
the load; and
the feeder for switching a load according to claim 8;
the feeder being disposed between the distribution system and the load.

12. The connector for the circuit breaker and the downstream contactor according to claim 1, which further comprises a mechanical connector spacing the circuit breaker from the downstream contactor and serving as a contact surface for the connector.

13. The connector for the circuit breaker and the downstream contactor according to claim 1, wherein the connector is mounted on the circuit breaker and the downstream contactor orthogonal to the same mating direction.

* * * * *